(12) United States Patent
Blessing

(10) Patent No.: US 6,926,238 B1
(45) Date of Patent: Aug. 9, 2005

(54) SUPPORT STRUCTURE WITH Y-SHAPED SUPPORT STAND

(75) Inventor: David Blessing, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 4 days.

(21) Appl. No.: 10/625,119

(22) Filed: Jul. 23, 2003

(51) Int. Cl.[7] ............................................. A47K 1/04
(52) U.S. Cl. ...................... 248/129; 248/424; 248/432; 248/178.1
(58) Field of Search .............................. 248/129, 424, 248/432, 435, 178.1; 269/17, 46

(56) References Cited

U.S. PATENT DOCUMENTS

| | | | | |
|---|---|---|---|---|
| 4,564,178 A | * | 1/1986 | Steffe | 414/590 |
| 4,685,859 A | * | 8/1987 | Marshall, Jr. | 414/590 |
| 4,966,341 A | * | 10/1990 | Borsani | 248/165 |
| 5,065,989 A | * | 11/1991 | Ho | 269/139 |
| 5,505,425 A | * | 4/1996 | Shelton | 248/670 |
| 6,109,600 A | * | 8/2000 | Yost et al. | 269/17 |
| 6,595,530 B2 | * | 7/2003 | Wood | 280/42 |

* cited by examiner

Primary Examiner—Korie Chan
Assistant Examiner—Kofi Schulterbrandt
(74) Attorney, Agent, or Firm—Karl A. Vick; Colin M. Raufer; Greg Garmong

(57) ABSTRACT

A support structure includes a support stand operable with a supported article. The support stand has a pair of side pieces. Each side piece includes a main beam, wherein a length of the main beam is optionally adjustable, and an angle beam joined to the main beam at an outward joining angle of from about 20 to about 60 degrees thereto. The main beams of the two side pieces are spaced apart and are parallel to each other. The support stand further includes two or more cross beams. The cross beams are spaced apart from each other and are each affixed to the two side pieces to form a top frame. A support base extends downwardly from the top frame and includes a pair of leading columns, wherein one of the leading columns is affixed to each of the main beams, and a pair of trailing columns, wherein one of the trailing columns is affixed to each of the angle beams. Desirably, a length of each of the leading columns and a length of each of the trailing columns is adjustable. Preferably, there is a caster at a lower end of each of the columns.

19 Claims, 2 Drawing Sheets

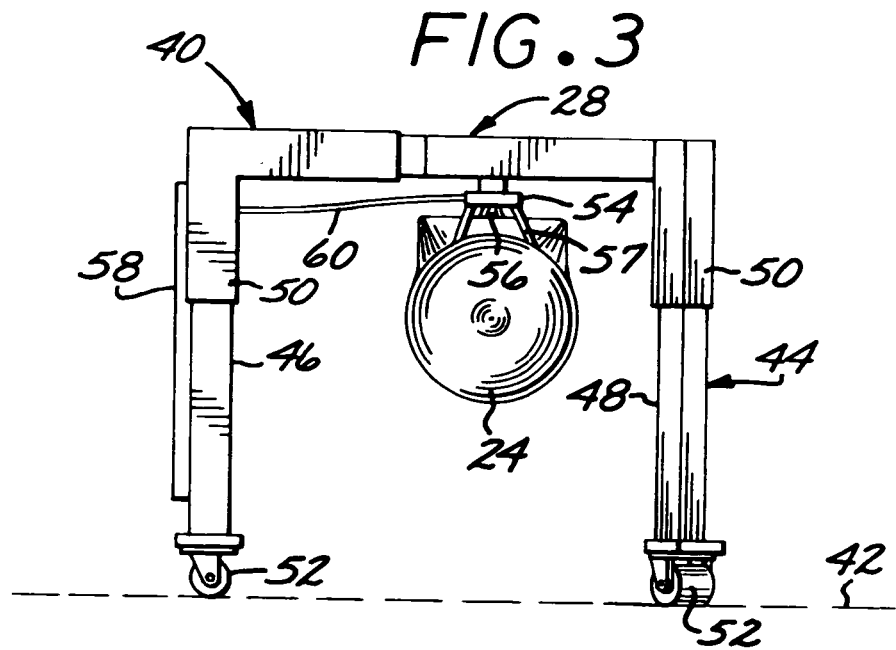
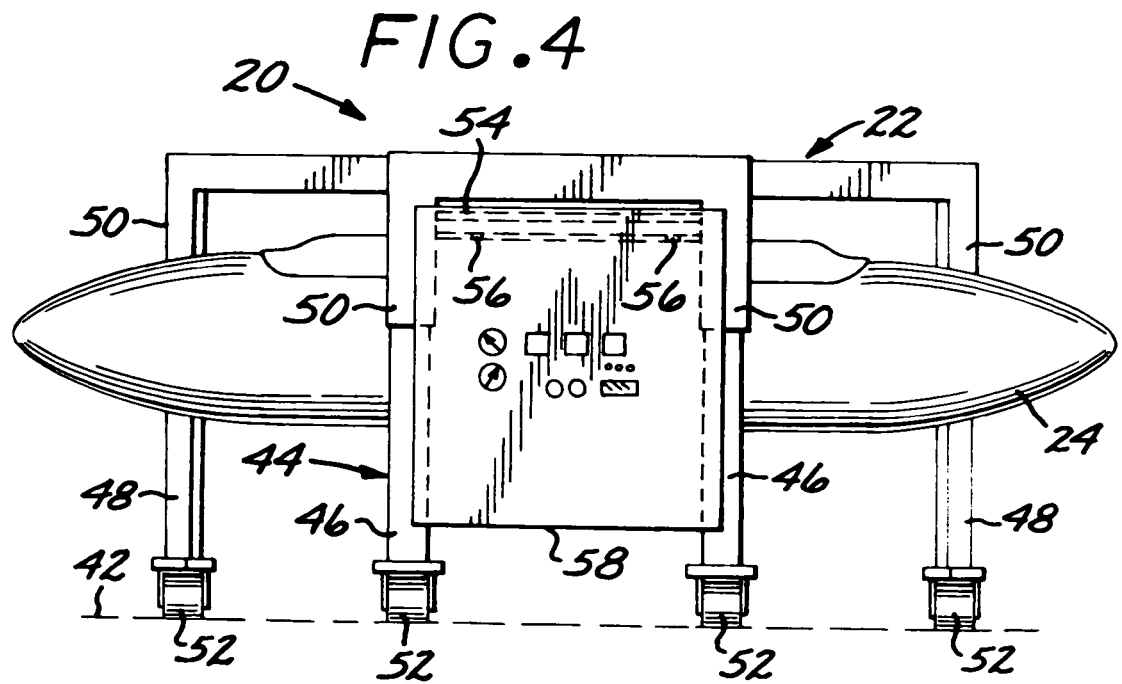

SUPPORT STRUCTURE WITH Y-SHAPED SUPPORT STAND

This invention relates to support stands for supporting articles thereon, and more particularly, to a support stand for aircraft stores.

BACKGROUND OF THE INVENTION

An aircraft reconnaissance pod is a device used to gather data as the aircraft is flown. The reconnaissance pod is usually mounted at a hard point below the wing or the fuselage of the aircraft. In a normal duty cycle, the reconnaissance pod is flown on a mission. After the mission is complete, the reconnaissance pod is removed from the aircraft on a wheeled cradle lift or transporter and rolled to a maintenance location. The reconnaissance pod is transferred from the cradle lift to a support stand. The reconnaissance pod is suspended from the support stand using the same suspension hooks that are used to support it from the underside of the aircraft during flight.

Maintenance operations are performed on the reconnaissance pod while it is suspended from the support stand. Such maintenance operations may include, for example, removing gathered data such as exposed film, replenishing expendables, making adjustments, repairing or replacing faulty or damaged structure and components, reprogramming computers, removing equipment not required for the next mission, and installing new equipment that is required for the next mission. When the maintenance work is complete, the reconnaissance pod is transferred back to the cradle lift, returned to the aircraft location, and re-installed on the aircraft.

Although the details of the work performed vary, similar types of maintenance cycles are performed on other aircraft stores as well as a wide variety of other types of equipment. Many types of military and civilian apparatus have become so complex that at least some portions of their maintenance must be performed at specialized maintenance locations away from the normal operating locations.

As described above, a support stand is often required to facilitate the maintenance operations and/or for parts of the initial manufacture of the article. The support stand must hold the article in a convenient position for the maintenance work to be performed. It should also allow movement around the area where the work is being performed, as from test station to test station, even in congested facilities. The physical arrangement of the support stand should not hamper access to the article, and desirably makes access straightforward. Additionally, it is often necessary to disassemble, crate, and transport the support stand from location to location, and/or to store the support stand in as compact a manner as possible. The design of the support stand should facilitate these various functions and requirements.

Existing support stands for reconnaissance pods and the like are operable, but the inventor has recognized that they have shortcomings in the degree to which they allow access to the serviced object, their convenience of use, their maneuverability, their transportability, and their storability. There is a need for an improved support stand. The present invention fulfills this need, and further provides related advantages.

SUMMARY OF THE INVENTION

The present invention provides a support structure including a support stand that is used to support an object during maintenance, manufacturing, and the like. The object to be worked on is supported reliability and safely. The support stand allows excellent access to the supported object and provides some on-board capability. The support stand is fully adjustable both horizontally and vertically to improve access and versatility. It is movable and highly maneuverable, facilitating its use in congested areas and in moving from one area to another. Its design is modular and allows the support structure to be readily disassembled for transport from location to location, and to be temporarily stored at one location while not in service in a space-efficient manner.

In accordance with the invention, a support structure comprises a support stand operable with a supported article. The support stand comprises a pair of side pieces. Each side piece comprises a main beam, wherein a length of the main beam is preferably adjustable, and an angle beam joined to the main beam at an outward joining angle of from about 20 to about 60 degrees (preferably about 45 degrees) thereto. The main beams of the two side pieces are spaced apart from and parallel to each other. A pair of cross beams are spaced apart from each other and are each affixed to the two side pieces to form a top frame. A support base extends downwardly from the top frame and comprises a pair of leading columns, wherein one of the leading columns is affixed to each of the main beams, and a pair of trailing columns, wherein one of the trailing columns is affixed to each of the angle beams. A length of each of the leading columns and a length of each of the trailing columns is preferably adjustable, and, preferably, there is a caster at a lower end of each of the columns.

For the support of a reconnaissance pod and similar applications, a lifting beam extends between the main beams. The lifting beam typically has a pair of suspension hooks or other attachment devices on a lower side thereof remote from the main beams. The suspension hooks or other attachment devices are compatible with lifting lugs or other attachment structure on the top side of the supported article. The suspension hooks are normally spaced apart from each other by either 18 inches or 30 inches for military applications.

An equipment rack may be affixed to the pair of leading columns. The equipment rack provides a convenient location for keeping tools and components convenient and handy. It also provides attachment points for, and management of, lines that may extend to the support stand, such as electrical lines, and hydraulic or pneumatic hoses.

The support structure may further include the supported article, such as an aircraft store. In the preferred application, the supported store is an aircraft reconnaissance pod.

The Y-shape of the support stand provides excellent rolling maneuverability in a tricycle-like manner so that the support stand may be wheeled into tight spaces and also through congested areas. For example, the Y-shape allows the support stand and its supported article to be wheeled through narrow doorways by a progressive movement in which one end of the support stand, usually the narrow end having the leading columns, is angled and moved through the doorway, the support stand is straightened, and the other end of the support stand is angled and moved through the doorway. The Y-shape and the adjustability also facilitate access to the supported article and the use of the single support stand on a variety of types of supported articles. The Y-shape allows a number of the support stands to be compactly stored in a nested manner, so that they occupy minimal space when not in use. The adjustability feature of the support stand also allows it to be disassembled for transport and then readily re-assembled as needed.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a side elevational view of the support structure of FIG. 2; and

FIG. 4 is a front elevational view of the support structure of FIG. 2.

DETAILED DESCRIPTION OF THE INVENTION

Figure 1:
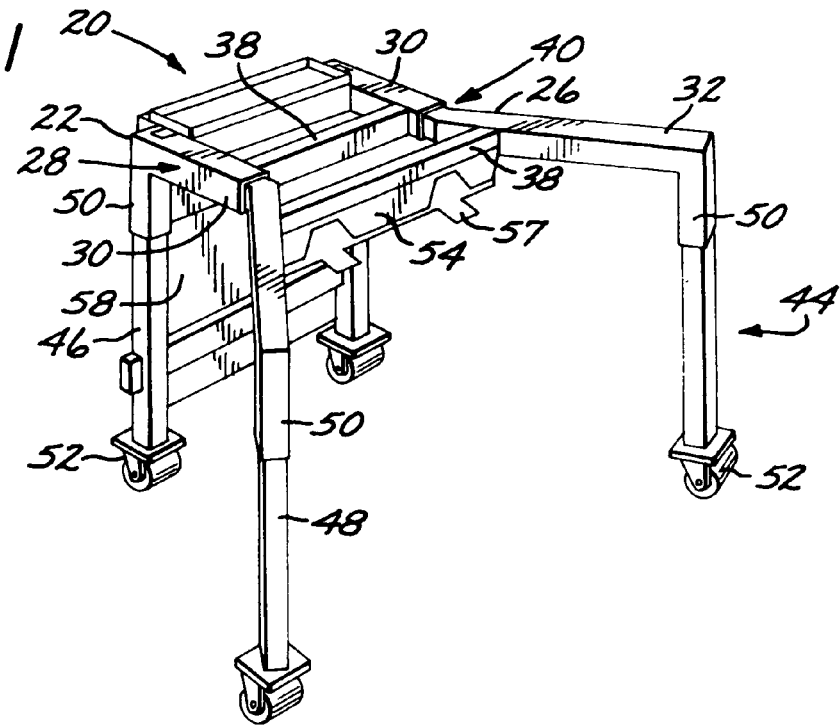
FIG. 1 is a perspective view of the support stand.
Figure 2:
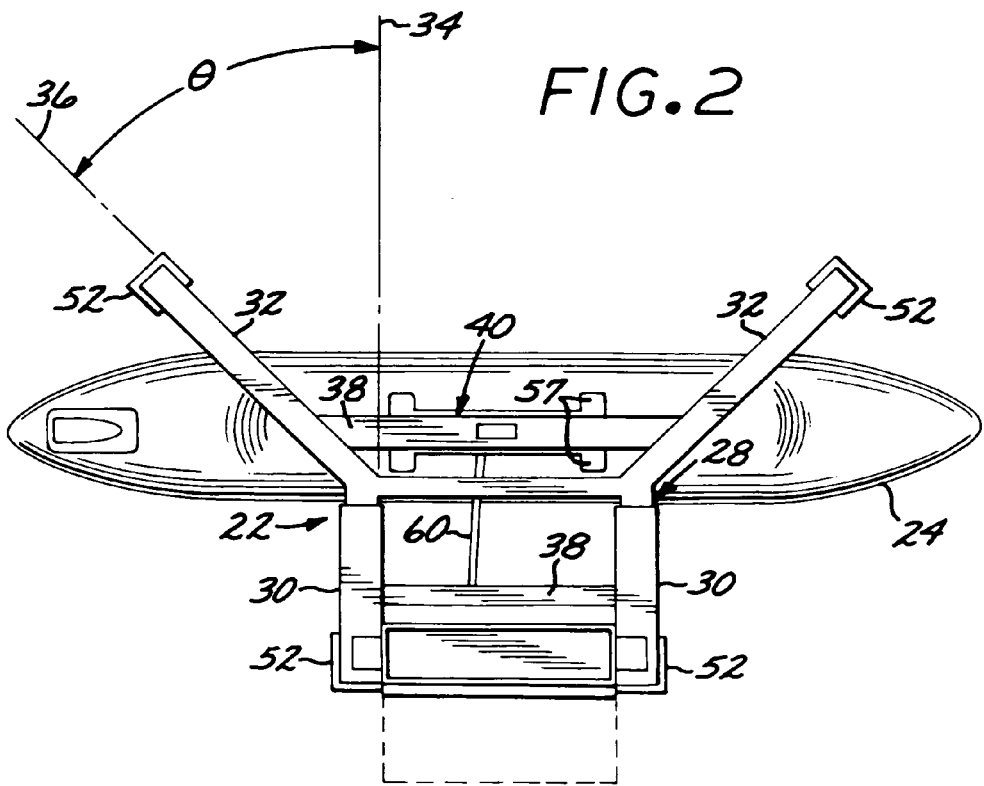
FIG. 2 is a top plan view of the support structure including the support stand and a supported article.

A preferred embodiment of a support structure 20 is illustrated in FIGS. 1–4. The support structure includes a support stand 22, seen in all of FIGS. 1–4. Optionally, a supported article 24 may be present, as seen in FIGS. 2–4. In a preferred embodiment, the supported article 24 is an aircraft store such as a reconnaissance pod, as illustrated in FIGS. 2–4. A reconnaissance pod of particular interest is the Shared Reconnaissance Pod (SHARP). The support stand 22, either as illustrated or with slight variations to accommodate different shapes, may be used with a wide variety of other types of supported payload articles 24 for both military and civilian applications.

The support stand 22 includes a pair of side pieces 26. Each side piece 26 comprises a main beam 28. A length of the main beam 28 is desirably, but not necessarily, adjustable with a sliding adjustment 30. In a preferred approach, the sliding adjustment is in the form of a tube sliding within a tube and a locking mechanism to lock the sliding mechanism in a selected position. There are preferably stops positioned as necessary at discrete intervals in each sliding adjustment, to ensure that the respective adjusted portions are of the same lengths when the adjustment is completed.

Each side piece 26 also includes an angle beam 32 joined to the main beam 28 at an outward joining angle of from about 20 to about 60, most preferably about 45, degrees thereto. The outward joining angle θ, illustrated in FIG. 2, is measured as the acute angle between an axis 34 of the main beam 28 and an axis 36 of the angle beam 32.

The main beams 28 of the two side pieces 26 are spaced apart from and parallel to each other. At least two, and optionally more, cross beams 38 extend between and position the side pieces 26 relative to each other. The cross beams 38 are spaced apart from each other. Each cross beam 38 is affixed at its opposing ends to the two side pieces 26 to form a top frame 40. In the conventional use of the support stand 22, the top frame 40 is parallel to the surface 42 upon which the support stand 22 rests, as seen in FIGS. 3 and 4. As seen in FIG. 2, the top frame 40 is generally "Y-shaped" when viewed from above.

The geometry of the top frame 40 may be fixed or variable. That is, the main beams 28, the angle beams 32, and the cross beams 38 may be rigidly affixed to each other and of constant length and angular relation to each other. More preferably, at least some adjustability is provided. In the preferred embodiment as illustrated, the lengths of the main beams 28 may be altered using their respective sliding adjustments 30. The lengths of the angle beams 32 and the cross beams 38 may also be provided with length adjustments in the same manner. The outward joining angle θ between each angle beam 32 and its respective main beam 28 may also be adjustable with an appropriate pivoting or other non-rigid joint between them. For the preferred application where the supported article 24 is the reconnaissance pod, the only adjustment that is desired is the illustrated sliding adjustment 30 of the main beams 28. This adjustment is desired primarily to allow convenient storage and assembly/disassembly for transporting, rather than to accommodate different sizes of supported articles 24.

A support base 44 extends downwardly from the top frame 40. The support base 44 comprises a pair of leading columns 46. One of the leading columns 46 is affixed to each of the main beams 28 at a downward angle that is preferably 90 degrees to the respective main beam 28. A pair of trailing columns 48 is affixed to each of the angle beams 32 at a downward angle that is preferably 90 degrees to the respective angle beam 32. The trailing columns 48 could instead be affixed to the opposite ends of the main beams 28 from the respective leading columns 46, but this would reduce the rolling maneuverability of the support stand 22. Optionally, a length of each of the leading columns 46 and a length of each of the trailing columns 48 is adjustable, using a sliding adjustment 50 which may be of the same type as the sliding adjustment 30. The sliding adjustment 50 changes the height of the top frame 40 and thence the height of the supported article 24 from the surface 42. The sliding adjustment may also be used to disassemble the lower portions of the columns 46 and 48 from their upper portions and thence from the top frame 40 for storage and transporting.

There is preferably a caster 52 at a lower end of each of the columns 46 and 48. The casters 52 are preferably rotatable 360 degrees (i.e., omnidirectionally) about the long axis of each of their respective columns 46 or 48 to which they are mounted to allow a leader-follower type of rolling movement of the support stand 22. The casters 52 are also desirably lockable so that the location of the support stand 22 may be fixed at a selected location.

The support stand 22 is also provided with attachment fittings specific to the configuration of the supported article 24, to provide the mechanical interface between the support stand 22 and the supported article 24. These attachment fittings are specific to the type of supported article with which the support stand 22 is to be used. That is, different attachment fittings may be used at different times with the same support stand 22, so that it may be readily adapted to different supported articles.

In the case of the preferred embodiment wherein the supported article 24 is the SHARP reconnaissance pod, a lifting beam 54 extends between the main beams 28. The lifting beam 54 may be affixed near its ends onto the main beams 28, or it may suspended below and affixed to one of the cross beams 38 along their contacting lengths, for example with threaded bolts. For supporting the SHARP reconnaissance pod as the supported article 24, the lifting beam 54 has a pair suspension hooks or other lifting structure on a lower side thereof remote from the top frame 40. The suspension hooks are adapted to releasably engage a mating lug structure on the top side of the supported article 24. The suspension hooks 56 are typically spaced apart by an amount to mate with those on the top of the aviation store, either 18 inches or 30 inches. Other types of attachment fittings may be used as well with the support stand 22. Sway braces 57 are also provided on the lifting beam 54 in this case, to prevent swaying of the supported article 24 when the support stand 22 is moved. The sway braces are small tabs affixed to the lifting beam 54 and extend downwardly to contact the sides of the supported article 24 and prevent it from swaying. The sway braces 57 may be made of any operable material, but a compliant material such as a thin piece of steel is preferred.

The main beams 28, cross beams 38, columns 46 and 48, lifting beam 54, and suspension hooks 56 are preferably made of steel for strength, tubular steel in the case of the main beams 28, cross beams 38, and columns 46 and 48. The size and strength of each of these elements may be selected according to the size of the support stand 22 and the weight of the supported article 24 for which it is designed. In the case of a prototype support stand 22 designed to support the SHARP reconnaissance pod, the overall length of the support stand 22 parallel to the main beams 28 is adjustable between 90 and 108 inches, the overall width is 58 inches measured between the main beams 28, and 76 inches measured at the widest extent of the angle beams 32, and the overall height between the top frame 40 and the surface 42 upon which the support stand 22 rests is adjustable between 64 and 80 inches.

One of the optional features of the support stand is an equipment rack 58 temporarily or permanently affixed to the pair of leading columns 46 or in that vicinity. The equipment rack 58 may be stationary or movable, such as a drop-down panel or work surface. The equipment rack 58 provides a place to store tools, hand-held instruments, and the like that are occasionally needed during the maintenance work performed on the supported article 24. The equipment rack 58 also provides a convenient location to mount instrumentation such as gauges, switches, and the like, for ready access and easy use by the maintenance personnel. Services such as electrical power, and hydraulic and pneumatic pressure may also be provided on the equipment rack 58. The equipment rack 58 then communicates with the supported article 24 through one or more umbilicals 60. One of the ongoing problems with the use of conventional maintenance stands is that tools, instruments, wheel-up carts, and services lines tend to create congestion around the supported article, inhibiting easy access to the supported article. If the maintenance stand and its article are moved to another location, all of the ancillary equipment and services lines must also be moved, sometimes with a considerable expenditure of time. With the present approach, the equipment rack 58 keeps the ancillary equipment and services lines well organized, so that they do not create congestion and so that the support stand 22 and its supported article 24 may be easily moved.

The Y-shape of the support stand 22 imparts excellent stability to the support stand and to the supported article 24. The supported article 24 is supported between the main beams 28, but the angle beams 32 serve somewhat as outriggers that prevent tipping of the support stand 22 yet do not inhibit access to the supported article 24. Additionally, the Y-shape of the support stand 22 and the use of omnidirectional casters 52 gives excellent mobility and maneuverability to the support stand 22. The Y-shape acts in the manner of a tricycle frame with both the front wheels and the rear wheels omnidirectionally steerable. This allows the entire support stand 22, with or without the supported article 24, to be maneuvered into constricted spaces and through narrow openings such as narrow doorways.

The support stand 22 may be disassembled at the sliding adjustments 30 and 50 for shipping. Additionally, the support stand 22 may be reduced to its smallest lengthwise dimension for storage, and a number of the support stands may be nested together to reduce the floor area required for storage. In some conditions, such as below-decks aircraft stores maintenance facilities, floor space is often at a premium, and the present approach helps to minimize the floor space required to store support stands when they are not in use.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A support structure comprising a support stand operable with a supported article, the support stand comprising:
   a pair of main beams, wherein the main beams are parallel and are spaced apart from each other and wherein each main beam has a first end and a second end;
   a pair of angle beams, wherein each angle beam has
      a first end affixed to one of the main beams at an outwardly joining angle of from about 20 to about 60 degrees thereto, and
      a second end,
   wherein each main beam and its respective angle beam joined thereto define a pair of side pieces;
   a pair of cross beams, wherein the cross beams are spaced apart from each other and are each affixed to the two side pieces to form a top frame which has a Y-shape when viewed from above; and
   a support base comprising
      a pair of leading columns, wherein one of the leading columns is affixed to and extends downwardly from each of the main beams, and
      a pair of trailing columns, wherein one of the trailing columns is affixed to and extends downwardly from each of the angle beams.

2. The support structure of claim 1, wherein a length of each of the main beams is adjustable.

3. The support structure of claim 1, wherein a length of each of the leading columns and a length of each of the trailing columns is adjustable.

4. The support structure of claim 1, further including a caster at a lower end of each of the columns.

5. The support structure of claim 1, further including a lifting beam extending between the main beams.

6. The support structure of claim 5, wherein the lifting beam has a pair of suspension hooks on a lower side thereof remote from the top frame.

7. The support structure of claim 5, wherein the lifting beam has a pair of suspension hooks on a lower side thereof remote from the top frame, and wherein the pair of suspension hooks is spaced apart from each other by either 18 inches or 30 inches.

8. The support structure of claim 1, further including an equipment rack affixed to the pair of leading columns.

9. The support structure of claim 1, wherein the joining angle is about 45 degrees.

10. The support structure of claim 1, wherein the support structure further includes the supported article.

11. The support structure of claim 1, wherein the support structure further includes the supported article, and wherein the supported article is an aircraft store.

12. A support structure comprising a support stand operable with a supported article, the support stand comprising:
   a pair of side pieces, wherein each side piece comprises
      a main beam, wherein a length of the main beam is adjustable, and an angle beam joined to the main beam at an outward joining angle of from about 20 to about 60 degrees thereto, wherein the main beams of the two side pieces are spaced apart from and parallel to each other;

a pair of cross beams, wherein the cross beams are spaced apart from each other and are each affixed to the two side pieces to form a top frame;

a support base extending downwardly from the top frame, the support base comprising a pair of leading columns, wherein one of the leading columns is affixed to each of the main beams, a pair of trailing columns, wherein one of the trailing columns is affixed to each of the angle beams, wherein a length of each of the leading columns and a length of each of the trailing columns is adjustable, and a caster at a lower end of each of the columns.

13. The support structure of claim 12, further including a lifting beam extending between the main beams.

14. The support structure of claim 13, wherein the lifting beam has a pair of suspension hooks on a lower side thereof remote from the top frame.

15. The support structure of claim 13, wherein the lifting beam has a pair of suspension hooks on a lower side thereof remote from the top frame, and wherein the pair of suspension hooks is spaced apart from each other by either 18 inches or 30 inches.

16. The support structure of claim 12, further including an equipment rack affixed to the pair of leading columns.

17. The support structure of claim 12, wherein the joining angle is about 45 degrees.

18. The support structure of claim 12, wherein the support structure further includes the supported article.

19. The support structure of claim 12, wherein the support structure further includes the supported article, and wherein the supported article is an aircraft store.

* * * * *